United States Patent Office 3,645,912
Patented Feb. 29, 1972

3,645,912
REGENERATION OF UNSUPPORTED VANADIUM
SULFIDE CATALYST
John G. Gatsis, Des Plaines, Ill., assignor to Universal
Oil Products Company, Des Plaines, Ill.
No Drawing. Filed Feb. 2, 1970, Ser. No. 8,000
Int. Cl. B01j *11/76, 11/02*
U.S. Cl. 252—411 R         2 Claims

ABSTRACT OF THE DISCLOSURE

A carbonized, unsupported vanadium sulfide catalyst is regenerated with hydrogen sulfide or elemental sulfur by way of a two-stage treatment at elevated temperatures. The first stage is effected at temperatures above about 500° C., whereby carbon disulfide is formed, and the second stage is effected at temperatures below about 500° C., whereby vanadium tetrasulfide is formed. In a preferred method, the carbonized catalyst and elemental sulfur are contacted and heated in a hydrogen sulfide atmosphere. Further, carbon disulfide may be used at the lower temperature to form the vanadium tetrasulfide.

APPLICABILITY OF INVENTION

The invention described herein is adaptable to a regeneration procedure. The catalytic composites, to which my invention is specifically directed, are the metallic sulfides of Group V of the Periodic Table. Furthermore, the metallic sulfide catalysts are unsupported, which term is intended to designate a catalyst, or catalytic component which is not an integral part of a composite with a refractory inorganic oxide carrier material. In accordance with The Periodic Table of the Elements, E. H. Sargent & Company, 1964, it is intended to apply the regeneration procedure to the carbonized sulfides of vanadium, niobium and tantalum. The regeneration procedure is particularly adaptable to vanadium sulfide.

The carbonized sulfides of the foregoing metals are those which have been employed in the slurry processing of asphaltene-containing hydrocarbonaceous material. This hydrocarbonaceous material, including atmospheric tower bottoms, vacuum tower bottoms, crude oil residuals, topped crude oils, coal oil extracts, crude oils extracted from tar sands, etc., are generally classified in the art as "black oils."

Hydrocarbonaceous black oils contain high molecular weight sulfurous compounds in exceedingly large quantities. In addition, the black oils contain excessive quantities of nitrogenous compounds, high molecular weight organo-metallic complexes principally comprising nickel and vanadium, and asphaltenic material. The asphaltenic material is generally found to be complexed or linked with sulfur, and, to a certain extent, with the organo-metallic contaminants. An abundant supply of such hydrocarbonaceous material exists most of which has a gravity less than 20.0° API, and which is further characterized by a boiling range indicating that 10.0% by volume, and generally more, has a normal boiling point of a temperature of about 1050° F.

The difficulty encountered in processing black oils, utilizing a fixed-bed of a supported catalyst, has indicated that the most advantageous route is the slurry process wherein an unsupported catalyst is admixed with the charge stock. The principal difficulty with a fixed-bed system is the lack of a technique which would afford the catalytic composite sulfur stability in the presence of the asphaltenic and organo-metallic compounds. Not only does the catalyst deactivate rapidly as a result of the formation of carbon, but the metallic contaminants become deposited upon the catalyst employed, steadily increasing in quantity until such time as the composition of the catalytic composite is changed to the etxent that undesirable results are obtained. The asphaltenic fraction consists primarily of high molecular weight, non-distillable coke precursors, insoluble in light hydrocarbons such as propane, pentane, or heptane.

The primary purpose of the present invention is to provide an efficient and economical scheme for the regeneration of the carbonized, unsupported catalyst utilized in the slurry processing of hydrocarbonaceous black oils. As hereinbefore set forth, my invention is particularly directed toward the regeneration of an unsupported vanadium sulfide catalyst.

OBJECTS AND EMBODIMENTS

A principal object of my invention is to provide a method for the regeneration of a carbonized, unsupported catalyst. A corollary objective is to regenerate a carbonized, unsupported vanadium sulfide catalyst.

Another object of my invention is to afford a regeneration procedure which converts the deposited metallic contaminants from the charge stock into catalytically active material.

These objects are accomplished by contacting and heating the carbonized catalyst with elemental sulfur at elevated temperatures. Therefore, in one embodiment, my invention encompasses a method for regenerating a carbonized non-stoichiometric vanadium sulfide catalyst which comprises heating said catalyst, in contact with elemental sulfur, hydrogen sulfide or mixtures thereof, at an elevated temperature above about 500° C. to form carbon disulfide, decreasing the temperature to a level below about 500° C. and contacting the substantially carbon-free catalyst with hydrogen sulfide, elemental sulfur, carbon disulfide or mixtures thereof to form vanadium tetrasulfide.

Other objects and embodiments of my invention, relating to particular regeneration conditions and techniques will become apparent from the following detailed summary of the invention.

SUMMARY OF INVENTION

Previous investigations into the slurry processing of hydrocarbonaceous black oils have indicated that the preferred unsupported catalytic component is a vanadium sulfide of non-stoichiometric sulfur content. The use of the term "unsupported" is intended to designate a catalytic component which is not an integral part of a composite with refractory inorganic oxide carried material. That is, the catalyst is a metallic sulfide in and of itself, without the addition thereto of extraneous material. Although the precise atomic ratio of sulfur to vanadium is not known with accuracy, X-ray analyses have indicated that the non-stoichiometric, catalytic sulfide has an atomic ratio of sulfur to vanadium not less than 0.8:1.0, nor greater than 1.8:1.0. This is not intended to mean that the catalytic vanadium sulfide has but a single specific sulfur/vanadium ratio, but rather refers to a mixture of vanadium sulfides having non-stoichiometric sulfur/vanadium atomic ratios in the aforesaid range. The catalytic vanadium sulfide is not identifiable as any of the stoichiometric vanadium sulfides, nor as $VS_4$, the tetrasulfide. Strangely, however, the catalytic sulfides are produced in the reaction zone in situ by the reduction of vanadium tetrasulfide at reaction conditions.

The slurry-type conversion process is generally effected by commingling the charge stock/vanadium sulfide slurry with hydrogen in an amount of from about 5,000 to about 100,000 scf./bbl. The slurry is introduced into a reaction zone, the inlet temperature generally being controlled at a minimum level of about 225° C., and at higher levels to the extent that the outlet temperature does not exceed about 500° C. The reaction chamber is generally maintained under an imposed pressure greater than about 500 p.s.i.g., and preferably a level of from 1,500 to about 5,000 p.s.i.g. One particularly preferred technique is to introduce the slurry mixture into a lower portion of the reaction zone. This has the advantage that the extremely heavy portion of the charge stock will have an appreciably longer residence time within the reaction zone, with the result that a greater degree of conversion is attainable.

The reaction product effluent is subjected to a series of separation steps which results in an asphaltenic sludge containing carbonized vanadium sulfide. Since the sludge will contain distillable hydrocarbon products, it is treated, for example, by a series of filtration and solvent washing techniques. Suitable solvents include methyl naphthalene, carbon tetrachloride, benzene, toluene, etc., which are utilized to remove the residual, soluble hydrocarbons from the catalyst-containing sludge. The remainder of the sludge is admixed with elemental sulfur, hydrogen sulfide or mixtures thereof, and heated to a temperature above about 500° C., and preferably to a level in the range of 700° C. to about 1,000° C. Carbon disulfide is formed at these temperatures, and is readily removed in the vaporous state. When substantailly free from the coke and other carbonaceous material, the temperature is lowered to a level below about 500° C., and preferably in the range of 250° C. to about 500° C. The continued contact with elemental sulfur, hydrogen sulfide, carbon disulfide or mixtures thereof effects the conversion to vanadium tetrasulfide which can then be re-used within the process as the precursor for the catalytic vanadium sulfide.

The overwhelming proportion of metallic contaminants in the fresh feed charge stock comprise nickel and vanadium. These metals are ultimately removed from the process in the asphaltenic sludge, and are subsequently converted, along with the original vanadium, to the sulfides. These metals, including the nickel, are reused within the process to effect further conversion of the asphaltenic material. Thus, through the utilization of my invention, the process can be considered virtually self-sustaining.

I claim as my invention:

1. A method for regenerating a carbonized, unsupported, nonstoichiometric vanadium sulfide catalyst employed in the slurry processing of asphaltene-containing hydrocarbonaceous material which comprises heating said catalyst, in contact with hydrogen sulfide, elemental sulfur or mixtures thereof, at an elevated temperature in the range of 700° C. to about 1000° C. to form carbon disulfide, decreasing the temperature of the catalyst to a level in the range of 250° C. to about 500° C., and contacting the substantially carbon-free catalyst at the reduced temperature with hydrogen sulfide, elemental sulfur, carbon disulfide or mixtures thereof to form vanadium tetrasulfide.

2. The method of claim 1 further characterized in that said carbonized catalyst is contacted and heated with elemental sulfur in a hydrogen sulfide atmosphere.

References Cited
UNITED STATES PATENTS

| | | | |
|---|---|---|---|
| 2,398,175 | 4/1946 | Cole | 252—419 |
| 2,709,639 | 5/1955 | Folkins et al. | 252—411.5 |
| 2,038,599 | 4/1936 | Pier et al. | 23—134 |
| 3,161,585 | 12/1964 | Gleim et al. | 208—264 |
| 3,558,474 | 1/1971 | Gleim et al. | 208—108 |

DANIEL E. WYMAN, Primary Examiner
P. E. KONOPKA, Assistant Examiner

U.S. Cl. X.R.

23—134, 138; 208—108, 215, 253, 264; 252—415